US011509556B2

(12) United States Patent
Medeiros et al.

(10) Patent No.: US 11,509,556 B2
(45) Date of Patent: Nov. 22, 2022

(54) DETERMINING PACKET LOSS IN A FRONTHAUL LINK (71) Applicant: Telefonaktiebolaget LM Ericsson (publ), Stockholm (SE)

(72) Inventors: Eduardo Lins De Medeiros, Sundbyberg (SE); Igor Almeida, Indaiatuba (BR); André Mendes Cavalcante, Indaiatuba (BR); Miguel Berg, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 170 days.

(21) Appl. No.: 16/769,705

(22) PCT Filed: Dec. 6, 2017

(86) PCT No.: PCT/SE2017/051223
§ 371 (c)(1),
(2) Date: Jun. 4, 2020

(87) PCT Pub. No.: WO2019/112497
PCT Pub. Date: Jun. 13, 2019

(65) Prior Publication Data
US 2020/0296019 A1 Sep. 17, 2020

(51) Int. Cl.
*H04L 43/0829* (2022.01)
(52) U.S. Cl.
CPC .............................. *H04L 43/0829* (2013.01)
(58) Field of Classification Search
CPC .... H04L 41/142; H04L 41/16; H04L 43/0829
See application file for complete search history.

(56) References Cited

U.S. PATENT DOCUMENTS 8,274,902 B2 *  9/2012  Bu ................... H04L 43/0835
                                                709/224
8,767,636 B2 *  7/2014  Fan ..................... H04W 72/10
                                                370/329

(Continued)

FOREIGN PATENT DOCUMENTS

WO      2011019534 A1    2/2011
WO      2016145371 A2    9/2016

OTHER PUBLICATIONS

Almes, G., et al., "A One-Way Loss Metric for IP Performance Metrics (IPPM)," Internet Engineering Task Force (IETF), Request for Comments: 7680, Category: Standards Track, Jan. 2016, 22 pages.

(Continued)

*Primary Examiner* — Khaled M Kassim
(74) *Attorney, Agent, or Firm* — Withrow & Terranova, PLLC (57) ABSTRACT

It is presented a method for determining packet loss in a fronthaul link of a radio access network. The method being performed in a packet loss determiner and comprising the steps of: obtaining a set of user equipments, UEs, that are all scheduled to communicate over a radio interface in a scheduling interval; creating a subset of UEs, comprising a number of UEs, from the set of UEs, that are the UEs in the set being most vulnerable to fronthaul packet loss; determining, for each UE in the subset of UEs, whether the communication in the scheduling interval was unsuccessful; and determining a packet loss in the fronthaul link depending on to what extent each one of the UEs in the subset of UEs is determined to have had unsuccessful use of the radio interface.

20 Claims, 4 Drawing Sheets (56) References Cited

U.S. PATENT DOCUMENTS

| | | | |
|---|---|---|---|
| 10,271,340 B1* | 4/2019 | Pawar | H04L 5/0055 |
| 11,388,618 B2* | 7/2022 | Charipadi | H04W 24/10 |
| 2002/0194361 A1* | 12/2002 | Itoh | H04L 1/0002 |
| | | | 709/233 |
| 2008/0043688 A1* | 2/2008 | Igarashi | H04W 72/1268 |
| | | | 370/338 |
| 2011/0038269 A1* | 2/2011 | Bu | H04W 24/08 |
| | | | 370/252 |
| 2015/0189544 A1* | 7/2015 | Chen | H04W 4/06 |
| | | | 370/230 |
| 2016/0373208 A1 | 12/2016 | Liu et al. | |
| 2018/0013597 A1* | 1/2018 | Barbieri | H04L 27/26 |
| 2019/0028231 A1* | 1/2019 | Wang | H04L 1/0045 |
| 2020/0389806 A1* | 12/2020 | Charipadi | H04W 24/10 |

OTHER PUBLICATIONS

Chowdhury, Shihabur Rahman, et al., "PayLess: A Low Cost Network Monitoring Framework for Software Defined Networks," 2014 IEEE Network Operations and Management Symposium (NOMS), Krakow, 2014, 9 pages.

Mitcsenkov, Attila, et al., "Minimal Cost Availability Improvement of Fixed Mobile Convergent (FMC) Access Networks: Diversification and Redundancy," 17th International Conference on Transparent Optical Networks (ICTON), Budapest, 2015, IEEE, 4 pages.

Morton, A., et al., "Packet Reordering Metrics," Internet Engineering Task Force (IETF), Request for Comments: 4737, Category: Standards Track, Nov. 2006, 45 pages.

International Search Report and Written Opinion for International Patent Application No. PCT/SE2017/051223, dated Jul. 12, 2018, 11 pages.

* cited by examiner

DETERMINING PACKET LOSS IN A FRONTHAUL LINK

This application is a 35 U.S.C. § 371 national phase filing of International Application No. PCT/SE2017/051223, filed Dec. 6, 2017, the disclosure of which is incorporated herein by reference in its entirety.

TECHNICAL FIELD

The invention relates to a method, packet loss determiners, a computer program and computer program product for determining packet loss in a fronthaul link.

BACKGROUND

In order to meet the increasing demand for data in next-generation mobile broadband networks (termed 5G systems), innovative and practical deployment solutions are required. For instance, 5G systems are expected to employ new network interfaces into the Centralized/Cloud Radio Access Network (C-RAN) architecture. Such interfaces support splitting of radio access functionality between a remote unit and a central unit.

The connection between the central unit (baseband processing unit) and the remote unit (radio node) is referred to as a fronthaul link or fronthaul network. A commonly used interface over the fronthaul link is Common Public Radio Interface (CPRI). The fronthaul link can be used to carry baseband radio samples in packets, allowing the use of high volume, relatively low cost Ethernet transceivers. Compression methods may be used in order to lower fronthaul bandwidth requirements.

Another approach for 5G cellular systems is to split the radio physical layer, moving some functions (e.g. symbol mapper, channel estimation, beamforming processing) from the baseband processing unit to the radio node.

The fronthaul links can be based on Internet Protocol (IP) or are bridged networks and can experience packet loss, e.g. due to congestion. An implicit effect of packet loss is that fronthaul issues may lead to longer term radio capacity impact, when radio interface control mechanisms, such as channel estimation and link adaptation, act on the data loss as if the data loss was due to radio interface issues, even though the data loss was independent of radio conditions.

SUMMARY

It is an object of embodiments herein to determine when packet loss has occurred over a fronthaul link.

According to a first aspect, it is presented a method for determining packet loss in a fronthaul link of a radio access network. The method being performed in a packet loss determiner and comprising the steps of: obtaining a set of user equipments, UEs, that are all scheduled to communicate over a radio interface in a scheduling interval; creating a subset of UEs, comprising a number of UEs, from the set of UEs, that are the UEs in the set being most vulnerable to fronthaul packet loss; determining, for each UE in the subset of UEs, whether the communication in the scheduling interval was unsuccessful; and determining a packet loss in the fronthaul link depending on to what extent each one of the UEs in the subset of UEs is determined to have had unsuccessful use of the radio interface.

The step of determining a packet loss may determine a packet loss when each one of the UEs in the subset of UEs is determined to have had unsuccessful use of the radio interface.

The step of determining a packet loss may comprise the substeps of: obtaining a respective weight for each one of the UEs in the subset of UEs; accumulating the weights for those UEs that are determined to have had unsuccessful use of the radio interface; and determining a packet loss when the accumulated weights are greater than a threshold value.

The scheduling interval may be a transmission time interval, TTI.

The step of creating a subset may be based on a current modulation and coding scheme, MCS, for each UE in the set of UEs.

The step of creating a subset may be based on a current code rate for each UE in the set of UEs.

The step of creating a subset may be based on a retransmission number for each UE in the set of UEs.

The step of creating a subset may comprise only including a single UE for any group of UEs considered to be geographically close.

In the step of creating a subset, UEs may be considered to be geographically close based on a maximum distance of determined positions of the UEs.

In the step of creating a subset, UEs may be considered to be geographically close based on a beam direction for each UE.

In the step of creating a subset, UEs may be considered to be geographically close based on uplink power control information.

The UEs may make use of the radio interface for downlink reception, in which case the step of determining whether use of the radio interface in the scheduling interval was unsuccessful may be based on hybrid automatic repeat request, HARQ, feedback.

The UEs may make use of the radio interface for downlink reception, in which case the step of determining whether use of the radio interface in the scheduling interval was unsuccessful may be based on channel quality indicator feedback.

The UEs may make use of the radio interface for uplink transmission, in which case the step of determining whether use of the radio interface in the scheduling interval was unsuccessful may be based on whether the uplink transmission is successfully decoded.

The UEs may make use of the radio interface for uplink transmission, in which case the step of determining whether use of the radio interface in the scheduling interval was unsuccessful may be based on uplink channel estimates.

According to a second aspect, it is presented a packet loss determiner for determining packet loss in a fronthaul link of a radio access network, the packet loss determiner comprising:

a processor; and
a memory storing instructions that, when executed by the processor, cause the packet loss determiner to:
obtain a set of user equipments, UEs, that are all scheduled to communicate over a radio interface in a scheduling interval;
create a subset of UEs, comprising a number of UEs, from the set of UEs, that are the UEs in the set being most vulnerable to fronthaul packet loss;
determine, for each UE in the subset of UEs, whether the communication in the scheduling interval was unsuccessful; and
determine a packet loss in the fronthaul link depending on to what extent each one of the UEs in the subset of UEs is determined to have had unsuccessful use of the radio interface.

The instructions to determining a packet loss may comprise instructions that, when executed by the processor, cause the packet loss determiner to determine a packet loss when each one of the UEs in the subset of UEs is determined to have had unsuccessful use of the radio interface.

The instructions to determine a packet loss may comprise instructions that, when executed by the processor, cause the packet loss determiner to: obtain a respective weight for each one of the UEs in the subset of UEs; accumulate the weights for those UEs that are determined to have had unsuccessful use of the radio interface; and determine a packet loss when the accumulated weights are greater than a threshold value.

The scheduling interval may be a transmission time interval, TTI.

The instructions to create a subset may comprise instructions that, when executed by the processor, cause the packet loss determiner to create the subset based on a current modulation and coding scheme, MCS, for each UE in the set of UEs.

The instructions to create a subset may comprise instructions that, when executed by the processor, cause the packet loss determiner to create the subset based on a current code rate for each UE in the set of UEs.

The instructions to create a subset may comprise instructions that, when executed by the processor, cause the packet loss determiner to create the subset based on a retransmission number for each UE in the set of UEs.

The instructions to create a subset may comprise instructions that, when executed by the processor, cause the packet loss determiner to only include a single UE for any group of UEs considered to be geographically close.

The packet loss determiner may further comprise instructions that, when executed by the processor, cause the packet loss determiner to consider UEs to be geographically close based on a maximum distance of determined positions of the UEs.

The packet loss determiner may further comprise instructions that, when executed by the processor, cause the packet loss determiner to consider UEs are to be geographically close based on a beam direction for each UE.

The packet loss determiner may further comprise instructions that, when executed by the processor, cause the packet loss determiner to consider UEs to be geographically close based on uplink power control information.

When the UEs make use of the radio interface for downlink reception, the instructions to determine whether use of the radio interface in the scheduling interval was unsuccessful may comprise instructions that, when executed by the processor, cause the packet loss determiner to base the determination on hybrid automatic repeat request, HARQ, feedback.

When the UEs make use of the radio interface for downlink reception, the instructions to determine whether use of the radio interface in the scheduling interval was unsuccessful may comprise instructions that, when executed by the processor, cause the packet loss determiner to base the determination on channel quality indicator feedback.

When the UEs make use of the radio interface for uplink transmission, the instructions to determine whether use of the radio interface in the scheduling interval was unsuccessful may comprise instructions that, when executed by the processor, cause the packet loss determiner to base the determination on whether the uplink transmission is successfully decoded.

When the UEs make use of the radio interface for uplink transmission, the instructions to determine whether use of the radio interface in the scheduling interval was unsuccessful may comprise instructions that, when executed by the processor, cause the packet loss determiner to base the determination on uplink channel estimates.

According to a third aspect, it is presented a packet loss determiner comprising: means for obtaining a set of user equipments, UEs, that are all scheduled to communicate over a radio interface in a scheduling interval; means for creating a subset of UEs, comprising a number of UEs, from the set of UEs, that are the UEs in the set being most vulnerable to fronthaul packet loss in a fronthaul link of a radio access network; means for determining, for each UE in the subset of UEs, whether the communication in the scheduling interval was unsuccessful; and means for determining a packet loss in the fronthaul link depending on to what extent each one of the UEs in the subset of UEs is determined to have had unsuccessful use of the radio interface.

According to a fourth aspect, it is presented a computer program for determining packet loss in a fronthaul link of a radio access network. The computer program comprises computer program code which, when run on a packet loss determiner causes the packet loss determiner to: obtain a set of user equipments, UEs, that are all scheduled to communicate over a radio interface in a scheduling interval; create a subset of UEs, comprising a number of UEs, from the set of UEs, that are the UEs in the set being most vulnerable to fronthaul packet loss; determine, for each UE in the subset of UEs, whether the communication in the scheduling interval was unsuccessful; and determine a packet loss in the fronthaul link depending on to what extent each one of the UEs in the subset of UEs is determined to have had unsuccessful use of the radio interface.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that data loss in fronthaul and data loss over radio are essentially independent. By evaluating success for scheduled transmissions for UEs which are most vulnerable to fronthaul packet loss, it can be determined when a fronthaul packet loss is likely to have occurred. In this way, mechanisms employed for data loss in the radio network can be avoided when a data loss is due to fronthaul packet loss, thus preventing erroneous radio interface related actions being employed.

Figure 1:
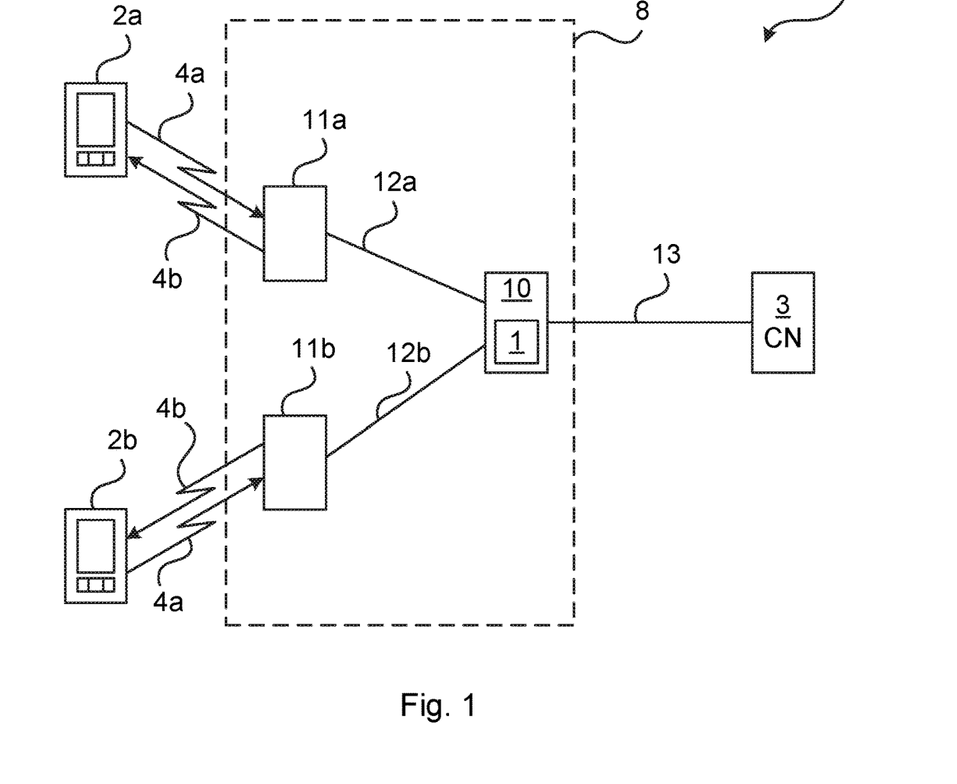
FIG. 1 is a schematic diagram illustrating an environment in which embodiments presented herein can be applied.

FIG. 1 is a schematic diagram illustrating a cellular communication network 9 where embodiments presented herein may be applied. The cellular communication network 9 comprises a core network 3 and one or more radio network nodes 8, here in the form of radio base stations being evolved Node Bs, also known as eNode Bs or eNBs. The radio network node 8 could also be in the form of Node Bs, BTSs (Base Transceiver Stations) and/or BSSs (Base Station Subsystems), etc. The radio network node 8 provides radio connectivity over a wireless interface 4a-b to a plurality of UEs (User Equipments) 2a-b.

Over the wireless interface, downlink (DL) communication 4b occurs from the radio network node 8 to the UEs 2a-b and uplink (UL) communication 4a occurs from the UEs 2a-b to the radio network node 8. The quality of the wireless radio interface to each UE 2a-b can vary over time and depending on the position of the UE 2a-b, due to effects such as fading, multipath propagation, interference, etc.

The radio network node 8 can comprise several antennas, e.g. in a MIMO antenna array to thereby enable beamforming to the UEs 2a-b by applying beamforming coefficients, respectively for each one of the antennas. The beamforming is applied separately for each UE 2a-b. The beamforming can be applied in downlink 4b and/or uplink 4a. A beam index defines the beamforming coefficients and corresponds to a direction from the radio network node 8.

The term UE 2 is also known as mobile communication terminal, user device, mobile terminal, user terminal, user agent, wireless device, wireless terminal, machine-to-machine device etc., and can be, for example, what today are commonly known as a mobile phone, smart phone or a tablet/laptop with wireless connectivity.

The cellular communication network 9 may e.g. comply with any one or a combination of 5G NR (New Radio), LTE (Long Term Evolution), LTE-Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

The radio network node 8 is connected to the core network 3 for connectivity to network central functions and a wide area network, such as the Internet.

The radio network node 8 is implemented in a distributed fashion, e.g. using a C-RAN (Centralised/Cloud Radio Access Network) architecture. The radio network node 8 here comprises a central unit 10 being a baseband processing unit and two remote units 11a-b being radio nodes. The central unit 10 and the remote units 11a-b can be in different locations. The central unit 10 is located uplink from the remote units 11a-b, i.e. towards the core network 3. Consequently, the remote units 11a-b are located downlink from the central unit 10, towards the UEs 2a-b. There are respective fronthaul links 12a-b between the central unit 10 and the remote units 11a-b. The fronthaul links 12a-b are bidirectional communication links. The fronthaul links 12a-b can be implemented using a Common Public Radio Interface (CPRI) or eCPRI (evolved CPRI) and Ethernet The central unit 10 comprises e.g. baseband processing and contains a packet loss determiner 1. Alternatively, the packet loss determiner can be provided separate from, but in communication with, the central unit 10. The packet loss determiner 1 does not even need to form part of the radio network node 8. As explained in more detail below, the packet loss determiner 1 can determine when a data loss is likely to have occurred due to packet loss over one or more of the fronthaul links 12a-b.

Figure 2:
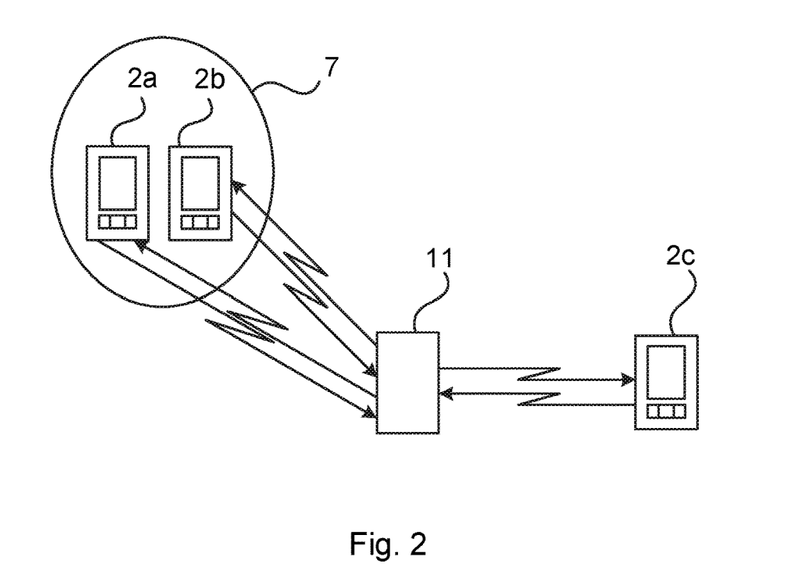
FIG. 2 is a schematic diagram illustrating a situation where two UEs are geographically close.

FIG. 2 is a schematic diagram illustrating a situation where two UEs are geographically close. In this scenario, a remote processing unit is connected to a first UE 2a, a second UE 2b and third UE 2c.

The first UE 2a and the second UE 2b are considered to be in the same geographical area 7, i.e. the first UE 2a and the second UE 2b are geographically close.

Since the first UE 2a and the second UE 2b are geographically close, they are likely to experience similar radio conditions. For instance, when there is significant interference or path loss for the first UE 2a, this is likely to be experienced also by the second UE 2b.

Figure 3A:
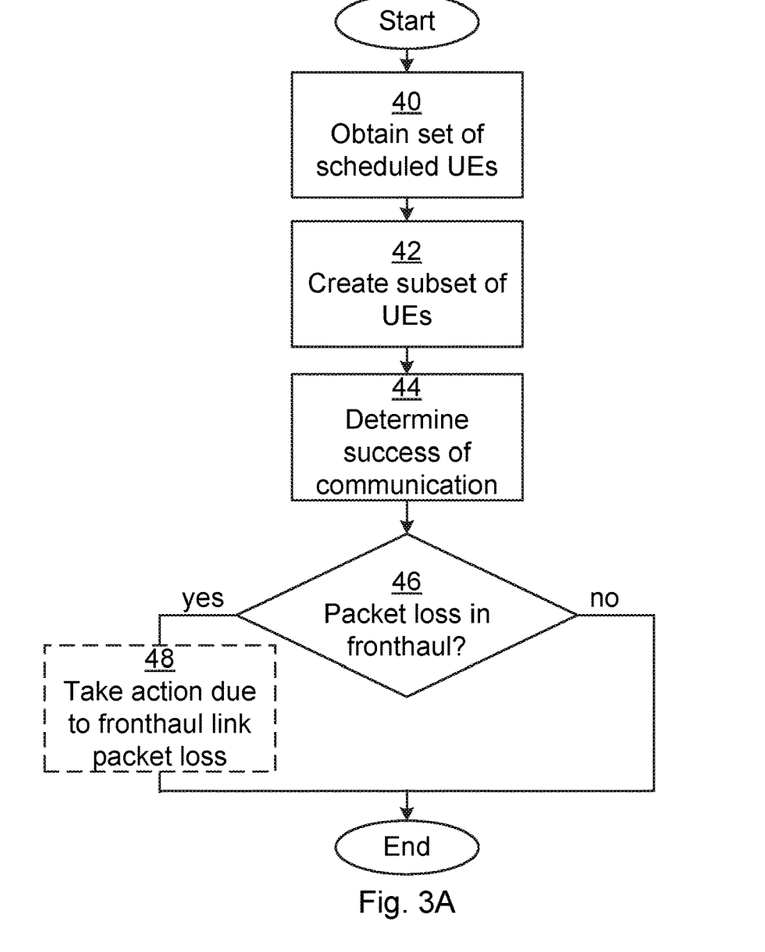
FIGS. 3A-B are flow charts illustrating embodiments of methods for determining packet loss in a fronthaul link of a radio access network.
Figure 3B:
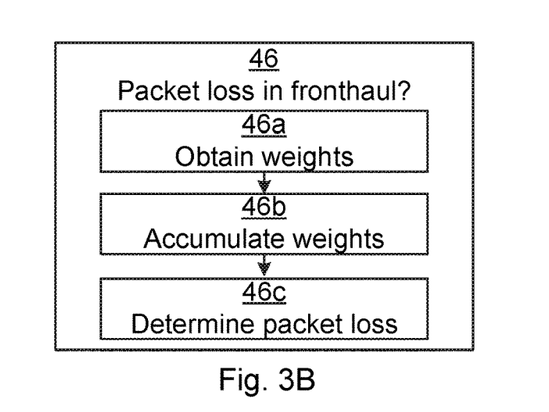

FIGS. 3A-B are flow charts illustrating embodiments of methods for determining packet loss in a fronthaul link of a radio access network. The methods are performed in the packet loss determiner. First, the method illustrated by FIG. 3A will be described. The method can be performed for a particular radio base station.

In an obtain set of scheduled UEs step 40, the packet loss determiner obtains a set of UEs that are all scheduled to communicate over a radio interface in a scheduling interval. The scheduling interval can e.g. be a transmission time interval (TTI). The packet loss determiner thus needs to be in close contact with a scheduler.

In a create subset of UEs step 42, the packet loss determiner creates a subset of UEs, comprising a number of UEs, from the set of UEs, that are the UEs in the set being most vulnerable to fronthaul packet loss. This can be achieved by sorting the set of UEs by vulnerability to fronthaul packet loss and selecting the first number of UEs in the sorted list.

When sudden performance degradation occurs, the decoding performance on each UE will be affected differently. UEs assigned high modulation and coding scheme (MCS) will be more susceptible to errors, and thus vulnerable to fronthaul packet loss. A higher MCS index implies a combination of modulation and coding supporting a larger transport block size and thus also a higher bit rate for a given amount of resource blocks. Hence, a current MCS indicates vulnerability to fronthaul packet loss, whereby in one embodiment, the subset of UEs are created based on a current MCS for each UE in the set of UEs, where UEs with high MCS are more vulnerable to fronthaul packet loss.

Another observation is that if the radio system has a form of HARQ (hybrid automatic repeat request) processing (e.g. LTE, NR), the number of retransmissions will also influence the decoding performance. Retransmission number is sometimes called redundancy version, e.g. in LTE. The reason for this is that the HARQ receivers can utilize incremental redundancy (forming a larger code word after each retransmission) and/or so called Chase combining (accumulating energy from prior transmission attempts). Consequently, in one embodiment, the subset of UEs are created based on a retransmission number for each UE in the set of UEs, where UEs with lower retransmission numbers are more vulnerable to fronthaul packet loss.

In one embodiment, also block error rate is used as a criterion for determining what UEs are most vulnerable to fronthaul packet loss.

In one embodiment, the fronthaul link is used to transport frequency domain samples. In such a case, if one or more packets carrying frequency domain samples are lost, the decoding of a set of subcarriers will fail. Furthermore, this loss of frequency domain samples does not depend on the modulation choice (low-order and high-order modulations will fail the same way). However, the loss does depend on the extent of error correcting code (e.g.: turbo codes, polar codes, or Reed-Solomon) that is applied. The more redundancy you add, the more errors you can correct, but added redundancy results in lower coder rate. The code rate is a ratio between 'useful bits' to 'useful bits+redundancy'. High code rates (7/8 for example) are used in good channels to maximize throughput. Low code rates (1/3) are used to guarantee connectivity at low speeds over bad channels.

Hence, in one embodiment, the subset of UEs are created based on a effective current code rate for each UE in the set of UEs. UEs that are connected using a higher code rate are more vulnerable to packet loss in the fronthaul link.

In one embodiment, the subset of UEs are created such that only a single UE is included for any group of UEs considered to be geographically close, See FIG. 2. This is due to UEs which are geographically close tend to be affected by issues in radio conditions in the same way, i.e. they have similar radio propagation conditions.

UEs can be considered to be geographically close based on a maximum distance of determined positions of the UEs. Alternatively or additionally, UEs are considered to be geographically close based on a beam direction (e.g. determined using beam index) for each UE. Alternatively or additionally, UEs are considered to be geographically close based on uplink power control information.

The probability that many UEs are affected by the same interference event decays rapidly as the number of UEs in the subset increase.

In a determine success of communication step 44, the packet loss determiner determines, for each UE in the subset of UEs, whether the communication in the scheduling interval was unsuccessful or successful.

The method works for both uplink and downlink. Here now follows a few examples of how communication success is determined, for downlink communication as well as for uplink communication.

When the UEs make use of the radio interface for downlink reception, the success determination can be based on HARQ feedback. Alternatively or additionally, when the UEs make use of the radio interface for downlink reception, the success determination can be based on channel quality indicator (CQI) feedback.

When the UEs make use of the radio interface for uplink transmission, the success determination can be based on whether the uplink transmission is successfully decoded. Alternatively or additionally, when the UEs make use of the radio interface for uplink transmission, the success determination can be based on uplink channel estimates.

In a conditional packet loss in fronthaul step 46, the packet loss determiner determines a packet loss in the fronthaul link depending on to what extent each one of the UEs in the subset of UEs is determined to have had unsuccessful use of the radio interface. In one embodiment, a packet loss in the fronthaul is determined when each one of the UEs in the subset of UEs is determined to have had unsuccessful use of the radio interface. In other words, when all of the N (being the number of UEs in the subset) most vulnerable UEs experience unsuccessful communication (uplink or downlink), this is considered to be a fronthaul packet loss. If a data loss occurs due to radio conditions, this is unlikely to occur in all of the N most (to fronthaul packet loss) vulnerable UEs.

When packet losses occur in fronthaul that carries time-domain IQ samples, all scheduled UEs will be negatively affected, independent on their geographical position. Equivalently, if all scheduled UEs experience simultaneous SINR (Signal to Interference and Noise Ratio) degradation, it is more likely that this has been caused by packet loss in fronthaul than from interference in the air-interface channel.

When a packet loss is determined, the method proceeds to an optional take action due to fronthaul link packet loss step 48. Otherwise, the method ends.

In the optional take action due to fronthaul link packet loss step 48, the base station can be prevented from applying radio interface mechanisms for addressing data loss, such as link adaptation, etc.

Looking now to FIG. 3B, this illustrates an embodiment of the conditional packet loss in fronthaul step 46. This embodiment is based on the UEs in the subset being provided weights for the fronthaul link packet loss determination.

In an obtain weights step 46*a*, the packet loss determiner obtains a respective weight for each one of the UEs in the subset of UEs. In one embodiments, the more vulnerable to packet loss the UE is, the greater weight is provided to it.

In an accumulate weights step 46*b*, the packet loss determiner accumulates the weights for those UEs that are determined to have had unsuccessful use of the radio interface.

In a determine packet loss step 46*c*, the packet loss determiner determines a packet loss when the accumulated weights are greater than a threshold value. In this embodiment, it can be prevented that a single UE communication success (e.g. due to fortunate error correcting code) results in the packet loss not being detected.

The embodiments presented herein do not need any adjustments to be made to any other entities in the network. Moreover, the fronthaul interfaces is not burdened with new control messages for the method; the method uses already standardised signals for its analysis.

Figure 4:
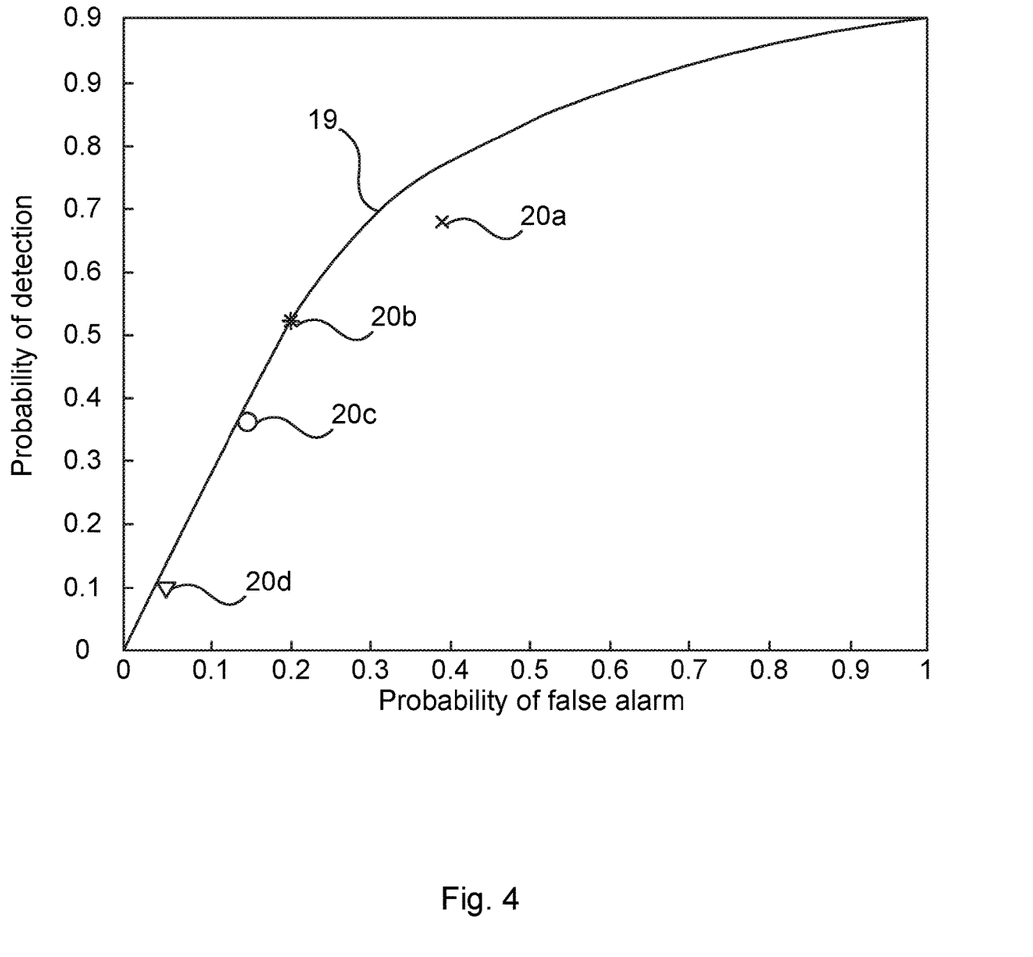
FIG. 4 is a schematic graph illustrating performance of various embodiments which can be applied in the environment of FIG. 1.

FIG. 4 is a schematic graph illustrating performance of various embodiments which can be applied in the environment of FIG. 1. The performance is for an embodiment where when all of the N (being the number of UEs in the subset) most vulnerable UEs experience unsuccessful communication (uplink or downlink), this is considered to be a fronthaul packet loss.

The horizontal axis represents probability of false alarm and the vertical axis represents probability of detection. A line 19 represents an optimal (Neyman-Pearson) detector.

As a basis for this evaluation, there are four scheduled users. A first data point 20a represents when N=1. A second data point represents when N=2. A third data point represents when N=3. A fourth data point represents when N=4.

In conclusion, a small N leads to high detection probability, but high probability of false alarm as well. In any case, the proposed detector approaches the optimal Neyman-Pearson detector.

Figure 5:
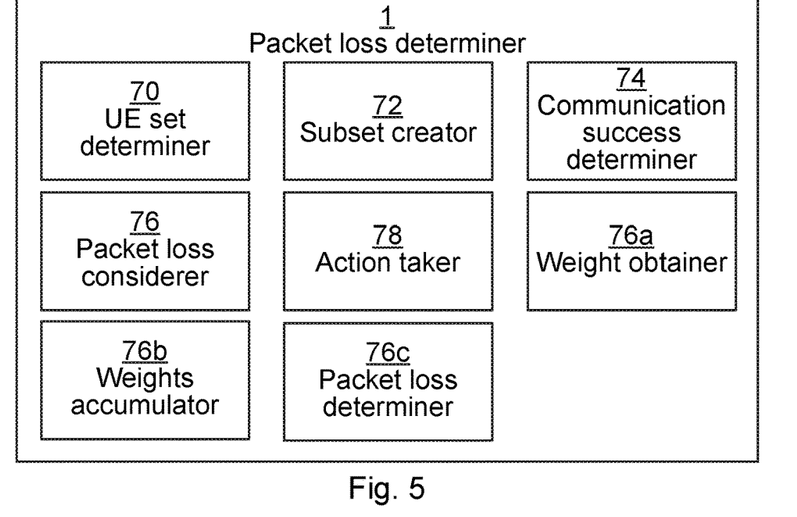
FIG. 5 is a schematic diagram showing functional modules of the packet loss determiner 1 of FIG. 1 according to one embodiment.

FIG. 5 is a schematic diagram showing functional modules of the packet loss determiner 1 of FIG. 1 according to one embodiment. The modules are implemented using software instructions such as a computer program executing in the packet loss determiner 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A-B.

A UE set determiner 70 corresponds to step 40. A subset creator 72 corresponds to step 42. A communication success determiner 74 corresponds to step 44. A packet loss considerer 76 corresponds to step 46. An action taker 78 corresponds to step 48. A weight obtainer 76a corresponds to step 46a. A weights accumulator 76b corresponds to step 46b. A packet loss determiner 76c corresponds to step 46c.

Figure 6:
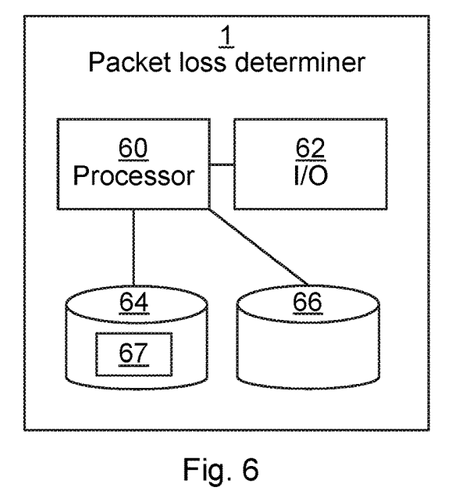
FIG. 6 is a schematic diagram illustrating components of the packet loss determiner of FIG. 1 according to one embodiment.

FIG. 6 is a schematic diagram illustrating components of the packet loss determiner 1 of FIG. 1. It is to be noted that when the packet loss determiner is provided in a host device, some or all of these components can form part of the host device. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. 3A-B above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM).

The packet loss determiner 1 further comprises an I/O interface 62 for communicating with other external entities. Optionally, the I/O interface 62 also includes a user interface.

Other components of the packet loss determiner 1 are omitted in order not to obscure the concepts presented herein.

Figure 7:
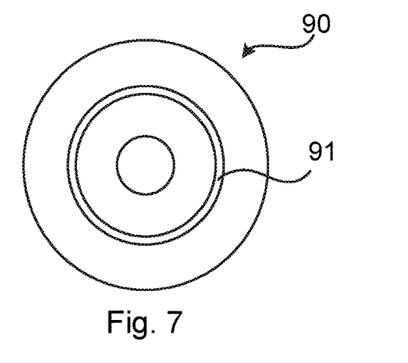
FIG. 7 shows one example of a computer program product comprising computer readable means.

FIG. 7 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining packet loss in a fronthaul link of a radio access network, the method being performed in a packet loss determiner and comprising the steps of:
   obtaining a set of user equipments, UEs, that are all scheduled to communicate over a radio interface in a scheduling interval;
   creating a subset of UEs, comprising a number of UEs, from the set of UEs, that are the UEs in the set being most vulnerable to fronthaul packet loss;
   determining, for each UE in the subset of UEs, whether the communication in the scheduling interval was unsuccessful; and
   determining a packet loss in the fronthaul link depending on to what extent each one of the UEs in the subset of UEs is determined to have had unsuccessful use of the radio interface.

2. The method according to claim 1, wherein the step of determining a packet loss determines a packet loss when each one of the UEs in the subset of UEs is determined to have had unsuccessful use of the radio interface.

3. The method according to claim 1, wherein the step of determining a packet loss comprises the substeps of:
   obtaining a respective weight for each one of the UEs in the subset of UEs;
   accumulating the weights for those UEs that are determined to have had unsuccessful use of the radio interface; and
   determining a packet loss when the accumulated weights are greater than a threshold value.

4. The method according to claim 1, wherein the scheduling interval is a transmission time interval, TTI.

5. The method according to claim 1, wherein the step of creating a subset is based on a current modulation and coding scheme, MCS, for each UE in the set of UEs.

6. The method according to claim 1, wherein the step of creating a subset is based on a current code rate for each UE in the set of UEs.

7. The method according to claim 1, wherein the step of creating a subset is based on a retransmission number for each UE in the set of UEs.

8. The method according to claim 1, wherein the step of creating a subset comprises only including a single UE for any group of UEs considered to be geographically close.

9. The method according to claim 8, wherein, in the step of creating a subset, UEs are considered to be geographically close based on a maximum distance of determined positions of the UEs.

10. The method according to claim 8, wherein, in the step of creating a subset, UEs are considered to be geographically close based on a beam direction for each UE.

11. The method according to claim 8, wherein, in the step of creating a subset, UEs are considered to be geographically close based on uplink power control information.

12. The method according to claim 1, wherein the UEs make use of the radio interface for downlink reception, and wherein the step of determining whether use of the radio interface in the scheduling interval was unsuccessful is based on hybrid automatic repeat request, HARQ, feedback.

13. The method according to claim 1, wherein the UEs make use of the radio interface for downlink reception, and wherein the step of determining whether use of the radio interface in the scheduling interval was unsuccessful is based on channel quality indicator feedback.

14. The method according to claim 1, wherein the UEs make use of the radio interface for uplink transmission, and wherein the step of determining whether use of the radio interface in the scheduling interval was unsuccessful is based on whether the uplink transmission is successfully decoded.

15. The method according to claim 1, wherein the UEs make use of the radio interface for uplink transmission, and wherein the step of determining whether use of the radio interface in the scheduling interval was unsuccessful is based on uplink channel estimates.

16. A packet loss determiner for determining packet loss in a fronthaul link of a radio access network, the packet loss determiner comprising:
a processor; and
a memory storing instructions that, when executed by the processor, cause the packet loss determiner to:
obtain a set of user equipments, UEs, that are all scheduled to communicate over a radio interface in a scheduling interval;
create a subset of UEs, comprising a number of UEs, from the set of UEs, that are the UEs in the set being most vulnerable to fronthaul packet loss;
determine, for each UE in the subset of UEs, whether the communication in the scheduling interval was unsuccessful; and
determine a packet loss in the fronthaul link depending on to what extent each one of the UEs in the subset of UEs is determined to have had unsuccessful use of the radio interface.

17. The packet loss determiner according to claim 16, wherein the instructions to determining a packet loss comprise instructions that, when executed by the processor, cause the packet loss determiner to determine a packet loss when each one of the UEs in the subset of UEs is determined to have had unsuccessful use of the radio interface.

18. The packet loss determiner according to claim 16, wherein the instructions to determine a packet loss comprise instructions that, when executed by the processor, cause the packet loss determiner to:
obtain a respective weight for each one of the UEs in the subset of UEs;
accumulate the weights for those UEs that are determined to have had unsuccessful use of the radio interface; and
determine a packet loss when the accumulated weights are greater than a threshold value.

19. The packet loss determiner according to claim 16, wherein the scheduling interval is a transmission time interval, TTI.

20. A program non-transitory computer-readable medium for determining packet loss in a fronthaul link of a radio access network, comprising computer program code which, when run on a packet loss determiner causes the packet loss determiner to:
obtain a set of user equipments, UEs, that are all scheduled to communicate over a radio interface in a scheduling interval;
create a subset of UEs, comprising a number of UEs, from the set of UEs, that are the UEs in the set being most vulnerable to fronthaul packet loss;
determine, for each UE in the subset of UEs, whether the communication in the scheduling interval was unsuccessful; and
determine a packet loss in the fronthaul link depending on to what extent each one of the UEs in the subset of UEs is determined to have had unsuccessful use of the radio interface.

* * * * *